July 17, 1956 E. L. BARRETT 2,755,329
CLOSURE FOR ALKALI BATTERIES
Filed May 31, 1952
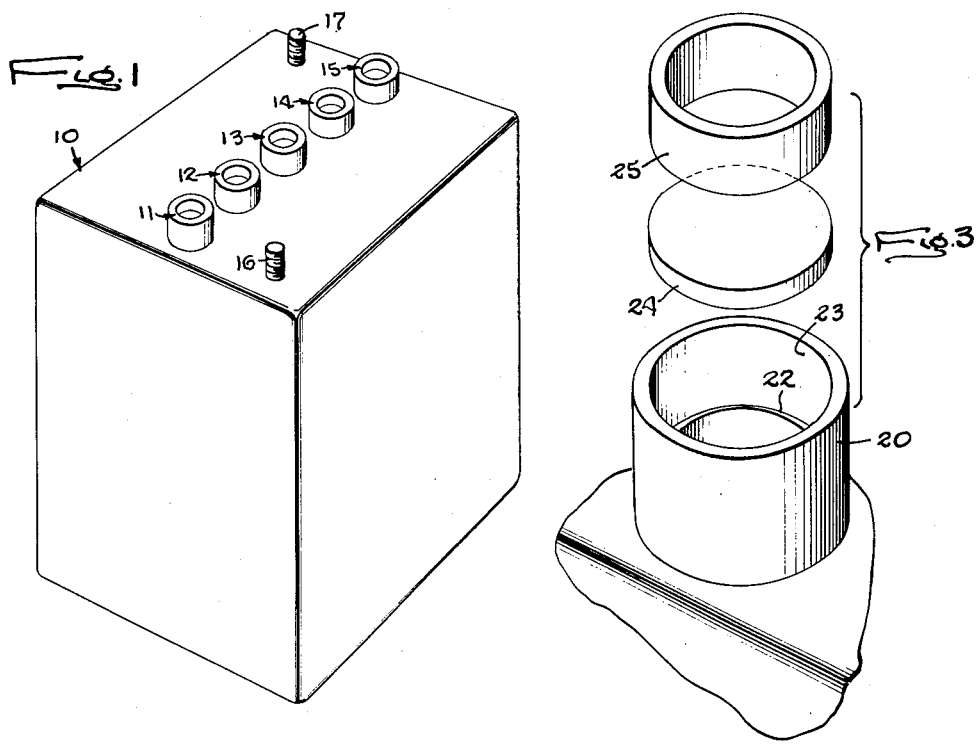
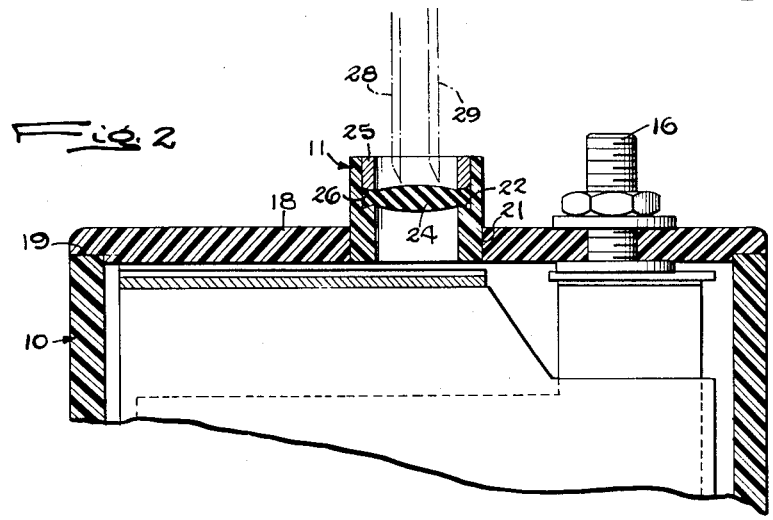
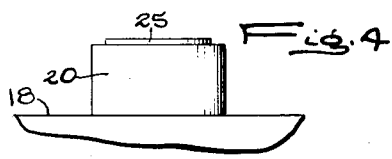
INVENTOR
Edward L. Barrett
Carlson, Pitzner, Hubbard & Wolfe
ATTORNEYS United States Patent Office 2,755,329
Patented July 17, 1956

2,755,329

CLOSURE FOR ALKALI BATTERIES

Edward L. Barrett, La Grange, Ill.

Application May 31, 1952, Serial No. 290,932

2 Claims. (Cl. 136—178)

The present invention relates to batteries, and more particularly to a closure for adding electrolyte to a battery cell.

Providing electrical power to a guided missile or the like in flight requires a battery capable of producing large amounts of power for short periods of time on the order of one to two minutes, and further requires that the available energy per cubic inch substantially exceed that obtainable from conventional types of batteries. One of the types of batteries having the desired characteristic to a high degree is that employing silver and zinc electrodes with an alkali electrolyte. Unfortunately, it is found that the "wet stand" life of such batteries is extremely short, on the order of a few hours. Consequently, it is necessary to store the batteries dry and to add the electrolyte before use. It has been proposed in the past to add the electrolyte through a modified rubber grommet using a hypodermic needle, with a second needle simultaneously inserted for removing the air which is displaced. The difficulty with this arrangement is that conventional constructions do not provide positive resealing when the hypodermic needles are withdrawn. In addition, there is risk that careless application of the needles may tear or rupture the rubber barrier so as to destroy any sealing effect. This reduces the reliability of the battery and furthermore endangers surrounding objects because of the corrosive effect of the electrolyte.

Accordingly, it is an object of the present invention to provide a novel closure for permitting batteries to be filled quickly and easily with a hypodermic needle, while providing positive resealing action when the needle is withdrawn. It is another object to provide a closure for a battery cell which is capable of resealing even though the filling needle may be carelessly handled and in spite of multiple penetration. It is a more detailed object of the invention to provide a closure for a battery cell which not only provides positive sealing, but is inexpensive and may be easily and quickly assembled.

Other objects and advantages of the invention will be apparent upon reference to the specification and drawing, in which:

Figure 1 shows an external view in perspective of a battery embodying closures constructed in accordance with the invention.

Fig. 2 is a fragmentary sectional view of one of the battery cells showing the closure in cross-section.

Fig. 3 is an exploded view of the closure showing the manner in which the elements are assembled during course of manufacture.

Fig. 4 is a fragmentary view showing the closure as it appears just prior to application of sealing pressure.

The invention is susceptible of various modifications and alternative constructions and uses and it will be understood that I do not intend to limit myself to the embodiment shown but aim to cover all modifications and alternatives falling within the spirit and scope of the appended claims.

Turning now to the drawing, the battery is indicated generally at 10, and is equipped with closures 11–15, inclusive. Electrical connections are made to terminals 16, 17.

Fig. 2 shows the first seal and its closure 11 in partial section. The closure 11 is mounted in the top of the battery 18, which may be constructed of polystyrene or the like and cemented to the battery walls at a joint 19. The closure has a cylindrical body portion 20 which may also be made of polystyrene. This body portion is fastened securely in the cover by cementing at a joint 21.

Internally the body portion has an integral shoulder 22 which faces upwardly defining a bore 23. A resilient disc or diaphragm 24 of rubber or the like is provided, which is dimensioned to fit snugly within the bore 23 and to rest upon the annular shoulder 22. For the purpose of placing the diaphragm 24 under edge pressure and for maintaining it securely in place, a sealing ring 25 is used having a sealing edge 26 which faces downwardly for contact with the upper surface of the disk or diaphragm 24 adjacent the periphery thereof. The annular shoulder 22 and sealing edge 26 are undercut, as shown in Fig. 2 to provide an annular space which is of keystone shape in cross-section.

In carrying out the present invention, the sealing ring 25 has an axial length which is somewhat longer than the length of the space above the diaphragm. Consequently when the elements are assembled together the sealing ring projects above the body portion 20 of the closure by a small amount on the order of $\frac{1}{32}$ of an inch, as shown in Fig. 4. As a final step in the assembly, pressure is applied to the sealing ring to bring it down into the position shown in Fig. 2. This tends to pinch the rubber diaphragm adjacent its periphery and to seal it in place. The force of this pinching action is concentrated inwardly from the periphery of the disk to form the body of said disk to lenticular shape to thus induce stress in the disk facilitating immediate and positive resealing upon withdrawal of a needle therefrom. The sealing ring is then secured in the position shown in Fig. 2 by application of cement or the like. I prefer to coat the outer surface of the sealing ring 25, as well as the bore 23, with a solvent liquid prior to inserting the sealing ring. Any suitable volatile solvent may be used capable of causing a superficial softening so that a bond is created when two such surfaces are brought into contact and maintained in contact until the solvent is evaporated or absorbed. After solvent is applied, the sealing ring is quickly inserted and pressed home into the position shown in Fig. 2. Pressure is maintained for a few minutes until the solvent is evaporated or absorbed by the body portion of the closure to provide a permanent seal.

The pinching of the periphery of the rubber diaphragm as shown in the drawing not only seals it in place for insertion of a hypodermic needle but also provides an improved resealing effect after the hypodermic needle has been withdrawn. This is believed due to the fact that the diaphragm is stressed, not only about its periphery, but throughout the central portion as well. Such stress is indicated by the fact that the diaphragm is formed into lenticular shape in cross-section (see Fig. 2), rather than flat. Because of the distribution of the prestressing force, it appears that rubber is quickly and positively pushed into the space occupied by the needle. Tests have shown that the filling needle, indicated at 28, may be carelessly applied and may be pushed through at a sharp angle without any sacrifice in the resealing effect. Even dull or broken needles may be used without danger that the diaphragm will be dislodged. In addition, a vacuum needle 29 may be inserted simultaneously with the filling needle 28 for the purpose of hastening the flow of fluid. If desired, both of these needles may be poked through the diaphragm repeatedly without destroying the seal. This is contrasted with the more conventional sealing arrangements in which the reliability is substantially lessened when the seal is punctured in more than one place.

The closure is particularly well adapted to quantity production. If desired, the portion 20 of the closure may be integrally molded in the cover 18. The rubber diaphragms may be inserted simultaneously, after which the sealing rings 25 may be coated with solvent and also inserted simultaneously. Pressure may then be applied by a suitable clamp capable of extending over all of the closures so that the sealing rings are brought down uniformly flush with the upper edge of the closure body and held in place for a short time. This insures that the rubber diaphragms are all prestressed to the same degree. The closure is particularly suitable for automatic assembly since the skill and judgment of an operator is not required. While rubber is preferred for the disc 24, it will be understood that the invention is not necessarily limited thereto and other resilient materials such as synthetic rubber may be used.

I claim as my invention:

1. A battery closure suitable for filling with a hypodermic needle comprising, in combination, a cylindrical body portion providing an internal annular shoulder and having a bore extending upwardly therefrom, a disk of rubber or the like in said bore and seated on said shoulder, said disk having smooth, uninterrupted faces which are substantially parallel to one another when the disk is in an unstressed state prior to its insertion into said bore to constitute a part of the closure, a sealing ring snugly received in said bore and in uniform pressing engagement with the upper surface of said disk adjacent the periphery thereof, said annular shoulder and the lower surface of said sealing ring being so formed as to define therebetween an annular space of generally keystone cross section so that the force applied to the disk by said sealing ring is concentrated inwardly from the periphery of said disk to form the body of said disk to lenticular shape to induce stress in the disk facilitating immediate and positive resealing upon withdrawal of a filling needle therefrom.

2. A battery closure suitable for filling with a hypodermic needle comprising, in combination, a cylindrical body portion providing an internal annular shoulder and having a bore extending upwardly therefrom, a substantially flat disk of rubber or the like in said bore and seated on said shoulder, a sealing ring snugly received in said bore for engaging the upper surface of said disk adjacent the periphery thereof, said shoulder and the lower surface of said sealing ring being so formed as to define therebetween an annular space of outwardly-flaring cross section causing localized pinching of the disk inwardly of the periphery thereof, said sealing ring having an axial length such that when the sealing ring is fully inserted into said bore flush with the top edge thereof said sealing ring bears on the upper surface of said disk adjacent the periphery thereof with sufficient pressure to form the latter into lenticular shape, so that stresses are set up in the disk which effect an instantaneous closure of a needle puncture therein upon withdrawing of a filling needle therefrom.

References Cited in the file of this patent

UNITED STATES PATENTS

| | | |
|---|---|---|
| 686,642 | Wayte | Nov. 12, 1901 |
| 789,877 | Perry | May 16, 1905 |
| 2,240,836 | Cotton | May 6, 1941 |
| 2,478,798 | Williams | Aug. 9, 1949 |
| 2,516,084 | Wells | July 18, 1950 |

FOREIGN PATENTS

| | | |
|---|---|---|
| 730,827 | France | May 23, 1932 |
| 460,273 | Germany | May 25, 1928 |
| 561,820 | Great Britain | June 6, 1944 |